(12) United States Patent
Eskelinen

(10) Patent No.: US 7,895,215 B2
(45) Date of Patent: Feb. 22, 2011

(54) METHOD AND COMPUTER PROGRAM PRODUCT FOR CLASSIFICATION AND LINKING DATA RECORDS, AND A CLASSIFICATION SYSTEM

(75) Inventor: Eero Eskelinen, Helsinki (FI)

(73) Assignee: Comptel Corporation, Helsinki (FI)

( * ) Notice: Subject to any disclaimer, the term of this patent is extended or adjusted under 35 U.S.C. 154(b) by 672 days.

(21) Appl. No.: 10/563,610

(22) PCT Filed: Jul. 2, 2004

(86) PCT No.: PCT/FI2004/000425

§ 371 (c)(1),
(2), (4) Date: Sep. 12, 2006

(87) PCT Pub. No.: WO2005/006217

PCT Pub. Date: Jan. 20, 2005

(65) Prior Publication Data

US 2007/0047705 A1    Mar. 1, 2007

(30) Foreign Application Priority Data

Jul. 10, 2003   (EP) ................... 03396071

(51) Int. Cl.
    *G06F 7/00* (2006.01)
(52) U.S. Cl. ...................... 707/752; 707/706
(58) Field of Classification Search ............... 707/102, 707/752, 706
See application file for complete search history.

(56) References Cited

U.S. PATENT DOCUMENTS

| 6,035,297 | A  | * | 3/2000  | Van Huben et al. ......... 707/695 |
| 6,055,539 | A  | * | 4/2000  | Singh et al. ................. 707/102 |
| 6,483,938 | B1 | * | 11/2002 | Hennessey et al. .......... 382/149 |
| 6,553,380 | B2 | * | 4/2003  | Minder ....................... 707/714 |
| 6,694,331 | B2 | * | 2/2004  | Lee ............................ 707/706 |
| 6,704,720 | B2 | * | 3/2004  | Arai et al. .................... 707/749 |
| 6,725,217 | B2 | * | 4/2004  | Chow et al. ................. 707/706 |
| 6,728,728 | B2 | * | 4/2004  | Spiegler et al. ............. 707/603 |
| 6,731,730 | B1 | * | 5/2004  | Zolotov ...................... 379/126 |
| 6,763,349 | B1 | * | 7/2004  | Sacco .................................. 1/1 |
| 7,165,068 | B2 | * | 1/2007  | Dedhia et al. ............... 707/740 |
| 7,340,451 | B2 | * | 3/2008  | Sacco ......................... 707/694 |
| 7,505,959 | B2 | * | 3/2009  | Kaiser et al. ....................... 1/1 |

* cited by examiner

*Primary Examiner*—Shahid Al Alam
*Assistant Examiner*—Alexandria Bromell
(74) *Attorney, Agent, or Firm*—Birch, Stewart, Kolasch & Birch, LLP

(57) ABSTRACT

This publication discloses a method for classifying and selecting records. This publication also discloses a classification and selection system according to the invention and a computer program product for classifying and selecting records. In the method according to the invention, a classification structure corresponding to a read field is selected (1001), a reference value according to the value contained in the field is searched (1004) from the selected classification structure, at least one class according to the conditions of the classification structure corresponding to the reference value is read (1007) from the selected classification structure, and the record is selected to the class read from the classification structure. The classification and selection system and computer program product according to the invention are suitable to the classification and selection of records.

16 Claims, 11 Drawing Sheets

Parameter file

| | Serv. ID | Valid from | Valid until | Field | Operand | Ref. Value |
|---|---|---|---|---|---|---|
| 401) | A1 | 01.01.2002 | 31.12.2010 | ASUB | = | 123 |
| 405) | A1 | 01.01.2002 | 31.12.2010 | ASUB | = | 124 |
| 407) | A1 | 01.01.2002 | 31.12.2010 | BSUB | = | 222 |
| 410) | B1 | 01.01.2002 | 31.12.2010 | ASUB | = | 456 |

402) 406) 408)

Valid set table

| Serv. ID | Frequency | Accuracy |
|---|---|---|
| 403) 409) A1 | 0 | 404) 409) 2 |
| B1 | 0 | 1 |
| | 0 | 0 |

Fig. 1

| Field Name | Length | Type<br>V=Char<br>N=Number | Definition |
|---|---|---|---|
| EXID | 8 | V | 101 |
| IMSI | 9 | N | 102 |
| TECH | 8 | V | 103 |
| SDATE | 14 | V | 104 |
| EDATE | 14 | V | 105 |
| DURAT | 9 | N | 106 |
| ANSW | 1 | N | 107 |
| ASUB | 32 | V | 108 |
| BSUB | 32 | V | 109 |
| CSUB | 32 | V | 110 |
| VOLUME | 9 | N | 111 |
| COUNTRY | 5 | V | 112 |
| OPERAT | 5 | V | 113 |
| PRICE | 9 | N | 114 |
| CHARGE | 9 | N | 115 |
| LF | 1 | N | 116 |

Event record file

```
FIN123   011223344DXF7    20030506113045200305061140450000006001
 EXID      IMSI    TECH         SDATE          EDATE       DURAT ANSW

+35831012356789              +35832098765431
      ASUB                          BSUB

+35833098765432              000000515FIN  000000000000000000\n
      CSUB                    VOLUME COUNTRY  PRICE    CHARGE LF
```

Fig. 4

| | Parameter file 402) 406) 408) | | 402) 406) 408) | | | |
|---|---|---|---|---|---|---|
| | Serv. ID | Valid from | Valid until | Field | Operand | Ref. Value |
| 401) | A1 | 01.01.2002 | 31.12.2010 | ASUB | = | 123 |
| 405) | A1 | 01.01.2002 | 31.12.2010 | ASUB | = | 124 |
| 407) | A1 | 01.01.2002 | 31.12.2010 | BSUB | = | 222 |
| 410) | B1 | 01.01.2002 | 31.12.2010 | ASUB | = | 456 |

Valid set table

| Serv. ID | Frequency | Accuracy |
|---|---|---|
| 403) 409) A1 | 0 | 404) 409) 2 |
| B1 | 0 | 1 |
| | 0 | 0 |

METHOD AND COMPUTER PROGRAM PRODUCT FOR CLASSIFICATION AND LINKING DATA RECORDS, AND A CLASSIFICATION SYSTEM

The present invention relates to a method, according to the preamble of claim 3, for classifying and selecting records. The invention also relates to a computer readable storage medium according to claim 31.

Methods of this kind are used, for example, for selecting rating for telephone network or other telecommunications network event data, transmitted over a telecommunications connection. In this case, the term telecommunications connection refers, for example, to a traditional fixed call, mobile data communications (GSM, GPRS, SMS, MMS, WAP, WLAN, 3G, etc.), and broadband data communications connections (IP, NGN, etc.).

In known methods, events, tickets, and, in general, records such as CDR, Call Detail Record; ER, Event Record; and UDR, Usage Data Record; and IDPR, Internet Protocol Detail Record, and similar event records, which are formed on the basis of, for example, telecommunications connection properties, are received. Records can be formed in response to the technical properties of the telecommunications connections, such as duration, time, source or destination, but as well as or instead of them the properties of the data transmitted over the telecommunications connections can also act as the initiator. In these solutions, the records are selected to service classes according to a logical classification structure, on the basis of such of their fields as have been set to be decisive. The service classes are specified on the basis of conditions relating to properties of the telecommunications connections that can be read from the records.

In methods according to the state of the art, data structures, such as main-memory structures browsed using sequential-access-type algorithms, and which are based on three linked lists, are used as the logical classification structures. These linked lists are gone through until the service ID, the conditions linked to which correspond to the values of the fields in the record, is found in some list. The identifying conditions of the services are recorded in the linked lists, in the manner shown in FIG. 2. In it, the service ID is recorded in the Services list, the name of the field in the Fields list, and the reference operator and reference value in the Rules list. Thus, a classification structure is obtained. In addition, information as to which service the field belongs to is recorded in each field, while information as to which field the condition belongs is recorded in each condition. The services, fields, and conditions are thus connected to each other.

Further, in the methods according to the state of the art, search algorithms like the following are used:
1. Read the first service from the 'Services' list, according to FIG. 2.
2. Read the first field relating to the service and the first condition relating to the field.
3. Compare the value of the field in the record with the first condition, and check if the condition is true. If it is not, search the next condition relating to the field.
4. If all conditions relating to the field are untrue, read the next service from the 'Services' list. If necessary, read new services from the list over and over again.
5. If the condition relating to the field is true, read the next field relating to the service from the 'Fields' list and start examining the conditions relating to the field.
6. Once a service class is found, the conditions of every field of which are true, the service class corresponding to the record has been found.

The solution according to the state of the art is easily internalized. In practice, no need has been found to improve the solution, which has remained nearly unaltered for many years. The performance of the solution is sufficient, if the number of services to be identified is at most a few hundred. At the same time, the lengths of the linked lists remain short.

Drawbacks appear in the state of the art in situations in which the prices of calls and/or other goods are calculated on the basis of values read from records. Once the number of services is increased to thousands, the solution's performance drops extremely rapidly and service identification forms a performance bottleneck. Nowadays, small systems must be capable of handling a few thousand services requiring identification, so that the speed of the known solution is insufficient.

A method for selecting rating is used, because before calculating a price defined by an individual record, it is first necessary to identify and select the service class to which the call, or other telecommunications connection initiating the creation of the record, belongs. In identification, the values of the record's fields are compared with the values in the logical structure of the set of parameters, which are recorded in the form of a conditional statement. If numerous services and their conditional statements are defined in a set of parameters, much time will be taken up identifying them. This will slow the selection of the rating, once the number of identifiable services classes rises to the thousands. This does not, however, limit the use of the invention to some specific number.

The invention is intended to create a method, which can process large numbers of service classes more efficiently. The method according to the invention can be applied not only to telecommunications connections, but also to select rating for the provision of various contents and services. Further, the method according to the invention can be applied in all kinds of mediation environments, including payment beforehand (prepaid), payment based on billing (postpaid), and combinations of them (convergent mediation). In such environments, the number of service classes becomes considerable, so that in practice solution models according to the state of the art cannot perform classification within an acceptable time. On a wider scale, it is thus possible to use the solution according to the invention to classify, from a large number, sets of even very different kinds of records that are convergent on the basis of specific properties, and to perform desired/necessary operations, for instance, rating, on these sets. Further, the method, system, and computer program product according to the invention are highly suitable to multi-corporation rating systems, which are disclosed in greater detail in the same applicant's previous patent application EP03396018.8, which is secret at the time of filing the present application.

The invention is based on reducing beforehand large numbers of service classes into specific sets, considerably larger numbers of which can also be managed faster than by using the old method. This is implemented with the aid of a set model, exploiting the basic calculations of Boolean algebra, AND and OR; intersection and union and NOT; complement, NAND and NOR for the various search condition sets, service categories, and conditional statements.

More specifically, the method, according to the invention, for classifying and selecting records is characterized by what is stated in claim 3. The computer readable storage medium, according to the invention, is characterized in claim 31.

Considerable advantages are gained with the aid of the invention. Because the method is more efficient than previously, substantially less time is used for identifying the numerous services and their conditional statements, thus substantially accelerating rating selection. If the time used to select rating is kept to the existing level, a larger set of service classes can be used.

In the preferred embodiment of the invention, allowance is made for the fact that generally only a few different fields of a record are used in the conditional statement of a service and that the same fields are generally used in the conditional statements of different services. Thus, the conditional statements differ from each other only on the basis of the reference values of the fields. When applying the invention, it is best to start from the assumption that there are many reference values, but few fields from which a value is read. Sometimes, however, it is necessary in a conditional statement to use different numbers of fields of a record, such as a call record, in which case different accuracies must be applied to the conditional statements. A conditional statement can be used, for example, to identify whether a call is a local call, a domestic long-distance call, or a foreign call. In such a case, more call-record fields will be used to identify a foreign call than a local call, because the necessary information about a foreign call includes the country called, the operator that received the call in the country, and the operator that handled the traffic between the countries. This means that a conditional statement identifying a foreign call will be generally more accurate than one identifying a local call. It is therefore worth taking accuracy into account when applying the invention.

Because known solutions use lists linked in one direction, a speed check is possible. When we used Rational Quantify software to investigate the operation of the solution in practice, more than 90% of the performance of the program involved string comparisons. In solutions according to the invention, it is therefore preferable to avoid string comparisons.

Due to the nature of the invention, its advantages also include independence of technology, form of application, and equipment manufacturer. Thus the records being processed can be in, for example, an ASCII or TAP3-type data, file, database, or online-based format. In a file-based format, the data being processed are recorded in a file. In a database-based format, the values of each record are first recorded in a database and the rater reads the necessary data from the database. In an online-based format, the rater reads the data in real-time, for example, through a socket connection, as soon as records arrive at it.

In the following, the invention is examined with the aid of examples and with reference to the accompanying drawings.

FIG. 1 shows the structure of one record.

FIG. 4 shows the initialization of one logical valid-set table according to the invention, on the basis of a parameter-set file.

Figure 2:
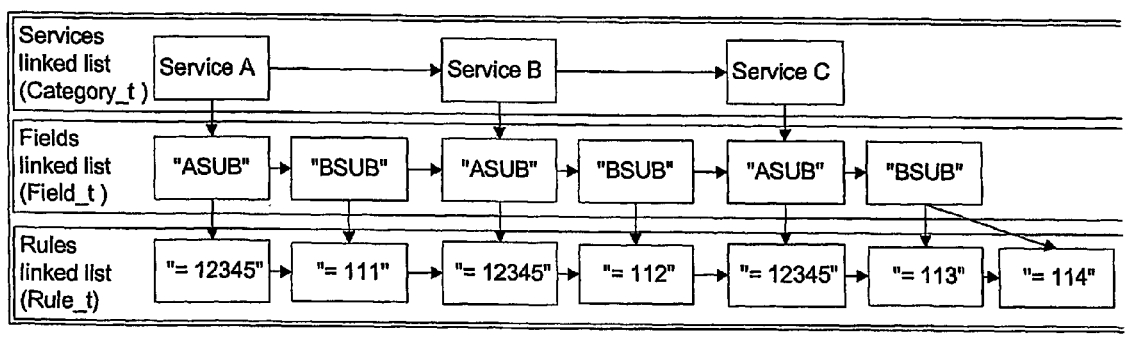
FIG. 2 shows one known linked list used as a logical structure.

The following describes an example of a situation, in which rating selection is required. Other solution models will be described later. The processing speed has been calculated for each of the most central solutions, the estimation of which makes it possible to decide which is the best solution to implement in each case. The method according to the invention can be applied to the processing of different formats. The records can be in different forms while different format values, such as numerical and symbolic values, are set in the fields, each different format having its own classification structure, and/or pointers to the classification structures.

Rating, Pricing Model, and its Use

EXAMPLE 1

The call record has 10 fields, two of which are used for identifying the services used in the call. The duration of the call is used when calculating the price of the call. The total price corresponding to the services used is written in the Total Price field.

The fields used in the identification of the services are:
ASUB—Caller's number, and BSUB—Recipient's number
   The other fields are:
DURAT—Duration of call, and PRICE—Total price
   The identification conditions of the services are as follows:
Service   A—ASUB=12345   AND   (BSUB=113   OR   BSUB=114)
Service B—ASUB=12345 AND BSUB=112
Service C—ASUB=12345
   The services have the following prices:

Service A—The service costs € 1.5/minute

Service B—The service costs € 1.2/minute

Service C—The service costs € 0.7/minute

The pricing model comprises identification conditions and prices of services.

If the values of the fields in the record are as follows:
ASUB—12345, BSUB—112, DURAT—600 seconds, and PRICE—empty
   The identification conditions of service B correspond to the values of the fields of the call record, in which case the price will be 600*(1.2/60)=12, which is entered in the record in the PRICE field and the record is moved to the next analysis.

EXAMPLE 2

The search algorithm and the data structure are implemented.

The data record records:

The Service ID, the Initial Date of Validity, the Final Date of Validity, and the Conditional Statement, which comprises several separate conditions.

The following requirements apply between the conditions of the conditional statement:

There is an AND operator between the conditions relating to different fields, and an OR operator between the conditions of the same field.

The following comparisons should be available in the conditions of the conditional statement:

Equal to (=), Less than (<), and Greater than (>). Other comparisons are also possible, such as, Greater than or equal to (>=), Less than or equal to (<=), of Not equal to (!=), Value interval ( a <X<b), as are more complex comparisons, such a regular expression and an extended regular expression.

Service ID:

The service ID binds the service's conditional statement and pricing data to each other. The conditional statement comprises several conditions, which are used to identify the services used in a call that has been made. The pricing data state what kind of rating should be applied to this service. In this example, the pricing data are not processed.

Service's conditional statement:

When initializing the data structure, the conditional statements are read from the parameter-set file, in which they exist in such a way that the service ID and one condition are on one line. The conditional statement is thus divided among several lines.

Form of parameter-set file:

| Service ID | Valid from | Valid until | Field | Operand | Ref. Value |
|---|---|---|---|---|---|
| A1 | 01.01.2002 | 31.12.2010 | ASUB | = | 123 |
| A1 | 01.01.2002 | 31.12.2010 | ASUB | = | 124 |
| A1 | 01.01.2002 | 31.12.2010 | BSUB | = | 222 |
| B1 | 01.01.2002 | 31.12.2010 | ASUB | = | 456 |

This means that Service A1 has been used in the call, if the following conditional statement is true: (ASUB=123 OR ASUB=124) AND BSUB=222.

Because the conditional statements used to identify services do not exclude each other, but instead several conditional statements can correspond to a service, the following accuracy principle is used to identify the service:

The accuracy of the conditional statement, i.e. of the service, is the number of the differently named fields appearing in the conditional statement. The search is started from the service with the greatest accuracy. The conditional statements are arranged in order on the basis of accuracy, from the largest to the smallest. Once the conditional statement corresponding to the values of the fields of the call record has been found, the search is terminated and rating is performed according to the service corresponding to the conditional statement. If a conditional statement corresponding to the values of the fields of the call record is not found, the call record is rejected. If several conditional statements corresponding to the values of the fields of the call record are found, all of which have the same accuracy, the first service in alphanumeric order, for example, is chosen, and rating is performed according to this service. This accuracy principle is used in the state of the art and similar accuracy principles can also be applied in the embodiments of the invention.

EXAMPLE 3

Description of a Record

A record, in this case a call record, is created when a telephone exchange records, in a raw data file, the data of a call made. The call records are retrieved from the telephone exchange and converted into strings. The analyses preceding rating read and edit the values in the record. The data required for rating are often added to the record during the analyses.

A record is divided into fields of differing length, a field being either in the form of string or numeric. A record ends with a line feed, after which the next record starts. In string-form fields, the value is at the left-hand edge of the field, there being a space after the value, up to the start of the next field. In numeric fields, the value is at the right-hand edge of the field while leading zeros precede the value. A name depicting the contents of the field is selected as the name of the field.

Description of Record According to FIG. 1

There are innumerable different types of record, the fields that usually appear in a record being listed in the example of the figure. Similar names for the commonest fields have become established in the record descriptions of different exchange suppliers in the following manner. The numbering 101-116 is only a technique used when writing this publication. The fields 101-116 actually contain the content shown below, instead of the number.

| | |
|---|---|
| 101 | Exchange ID |
| 102 | Call ID |
| 103 | Telephone exchange technology |
| 104 | Date and time of start of call |
| 105 | Date and time of end of call |
| 106 | Duration of call |
| 107 | Answer data |
| 108 | Caller's telephone number |
| 109 | Recipient's telephone number |
| 110 | Transmitted telephone number |
| 111 | Volume of data transmitted |
| 112 | Caller's country code |
| 113 | Operator code |
| 114 | Calculated price |
| 115 | Calculated charge |
| 116 | Line feed |

Known Use of Linked Lists According to FIG. 2

The data structure of the known implementation is based on three linked lists, which are browsed using a sequential-search-type algorithm. In this solution, the linked lists are browsed until the ID of a service is found, with conditions corresponding to the values of the fields of the record.

When constructing the data structure, such as the main-memory structure, the identifying condition of the services is recorded in the linked lists, for example, so that the service ID is recorded in the 'Services' list and the name of the field in the 'Fields' list and the reference operator and reference value in the 'Rules' list. In addition, information concerning the service to which the field belongs, and to which field in the conditions the condition belongs, is recorded in each field. In this way the services, fields, and conditions are connected to each other. The search algorithms described have been used in the beginning of this document.

Some Embodiments According to the Invention

Data structures like those described in the following are preferably used to find the correct logical statement from a large set, in order to reduce the number of string comparisons needed to classify and select a record.

In a powerful solution of a set of logic expressions it is not possible to examine the truth of all the comparison conditions and the logical statements. This means that more powerful search/selection methods than sequential search or the parsing of a logical statement are required. More powerful search methods are, for instance, searches based on hash tables and searches based on trees, as well as a binary search from a sorted vector or table. Of these, the implementation selected for more detailed examination is a binary search from an sorted vector, as this is the simplest to implement. For example, in the C programming language, there are ready functions for sorting a vector, qsort( ) and for searching it, bsearch( ), nor do the other methods, such as trees or random-ization, add very much greater power. In practice, hash would probably be slightly more powerful than the solution described.

At least one field-specifically parsed classification structure can be used as the classification structure. There is reason to make such a complex data structure, in order to evaluate the logical expression using more powerful search methods. An implementation, in which binary search vectors are used, will be described later in greater detail, but the method can also be performed using other basic search-data-structure methods.

In both the known methods and in those according, to the invention the following stages are performed:

Records are received, the fields of which contain values. The record is preferably a record depicting an event in a telecommunications network. The fields are, for example, fields of the record that depict the duration of a connection and the volume of data transmitted over the connection. The values are, for example, numerical values depicting the duration and the volume of data.

The value contained in at least one predefined field is read from at least one received record, in which case, for example, the value of the duration of the connection or of the volume of data transmitted is read from a telecommunications network's event-description record.

The records are selected on the basis of the classification structure on classes, for example, telecommunications-network event-description records are selected to price classes, in order to perform rating.

The following factors characterize the methods according to the invention, compared to the state of the art:

At least one read field is identified and a field-specifically ordered classification structure is selected as the classification structure corresponding to each identified field.

This differs from the known method in that in the state of the art the classification structure is arranged class-specifically, so that the fields defining the class of the received record as a whole are compared in turn with each class, using a sequential search. In the solutions according to the invention, the classification structure is arranged field-specifically, so that each field defining the class of the received record corresponds to its own ordered classification structure, allowing searches to be rapidly performed on the basis of the value of the field.

The reference value according to the value contained in the field is searched from each selected classification structure. Thus, one classification structure can be, for example, according to the duration and another classification structure can be, for example, according to the volume of data transmitted. In the state of the art, on the other hand, individual comparisons take place against a specific reference value and an answer is received as to whether the value correspond to the reference value or not. Now the reference value according to the searched value is obtained directly from the structure, methodically and with few comparisons.

At least one class according to the conditions of the classification structure and corresponding to the reference value is read from each classification structure, thus providing a class or a set of classes, for example, from the separate classification structures, which correspond to the duration of the connection, and a class or set of classes, which correspond to the volume of data transmitted over the connection.

The record is selected to a class read from a field-specifically ordered classification structure. The class, to which the record is selected, is selected from the classes obtained from the field-specifically parsed structures, at least if more than one class has been obtained.

Figure 3:
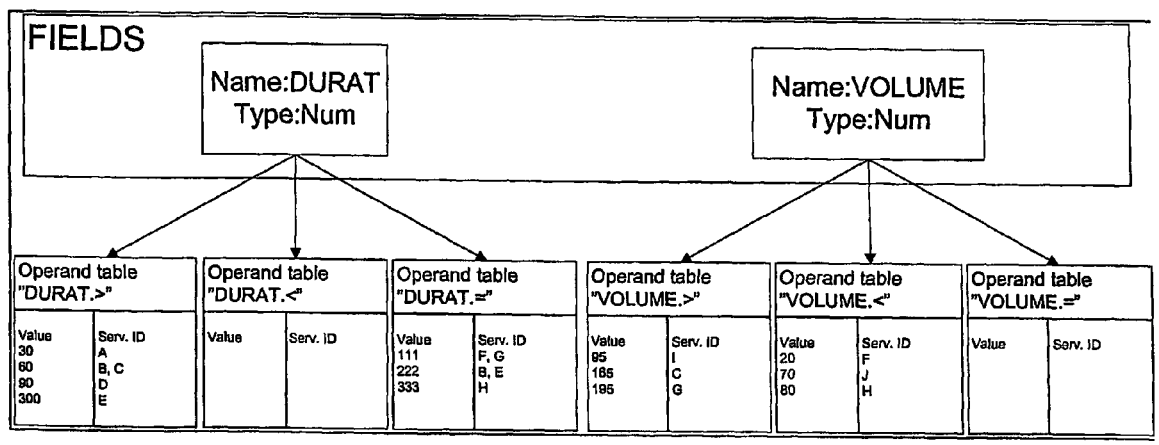
FIG. 3 shows the principle of one service-set solution according to the invention, as set operations.

The Principle of the Service-set Solution According to FIG. 3, as Set Operations The set model of the solution is based on operations between the service ID sets. The sets are formed on the basis of the values of the field, in such a way that a set of service IDs is formed for each field. In the field-specific sets are the IDs of the services, in which the condition of the field used in the conditional statement of the service is true. We select the ID of the service that appears in all the sets, i.e. its conditional statement is entirely true.

The model is implemented by applying union between the sets of the field of the OR operation defined in the accuracy principle and intersection between the field-specific sets of the AND operation. Union and intersection are depicted in pseudo-code, with the aid of a valid-set table.

The conditional statements corresponding to the services are as follows:

Service Conditional Statement
A—Durat>30
B—Durat>60 OR Durat=222
C—Durat>60 AND Volume>165
D—Durat>90
E—Durat>300 OR Durat=222
F—Durat=111 AND Volume<20
G—Durat=111 AND Volume>195
H—Durat=333 AND Volume<80
I—Volume>95
J—Volume<70

For example, for the values DURAT=222 and VOLUME=170, the following service sets are obtained from the structure:

for the condition '222>reference value', the DURAT field's Operand table DURAT.>gives the service set: {A B C D}, which is placed in the set set.DURAT for the condition '222 <reference value', the DURAT field's Operand table DURAT.<gives the service set: {}, which is added to the set set.DURAT, using the Union operation for the condition '222=reference value', the DURAT field's Operand table DURAT.=gives the service set: {B E}, which is added to the set set.DURAT, using the Union operation set.DURAT contains the services: {A B C D E} corresponding to the field's DURAT value.

for the condition '170>reference value', the VOLUME field's Operand table VOLUME.>gives the service set: {C I}, which is placed in the set set.VOLUME for the condition '170<reference value', the VOLUME field's Operand table VOLUME.<gives the service set: {}, which is added to the set set.VOLUME, using the Union operation for the condition '170=reference value', the VOLUME field's Operand table VOLUME.=gives the service set: {}, which is added to the set set.VOLUME, using the Union operation set.VOLUME contains the services: {C I} corresponding to the field's VOLUME value.

Finally, an Intersection operation is made between the sets of the various fields, which gives the service {A B C D E} AND {C I}={C} corresponding to all the fields and which is a valid service.

Valid-set Table Initialization According to FIG. 4

The use of the following data structure is preferable:

When initializing the data structure the conditional statements are read from the parameter-set file, in which they appear in such a way that a line has a service ID and one condition. In this way, the conditional statement is divided over several lines.

Form of the parameter-set file:

| Service ID | Valid from | Valid until | Field | Operand | Reference value |
|---|---|---|---|---|---|
| A1 | 01.01.2002 | 31.12.2010 | ASUB | = | 123 |
| A1 | 01.01.2002 | 31.12.2010 | ASUB | = | 124 |
| A1 | 01.01.2002 | 31.12.2010 | BSUB | = | 222 |
| B1 | 01.01.2002 | 31.12.2010 | ASUB | = | 456 |

The initialization of the data structure is divided into the initialization of a Valid-set table and the initialization of a Fields table.

The Service ID is read from the parameter-set file and the number of different fields used in the conditional statement is calculated and the number is entered in the Accuracy column. There are three columns in the Valid-set table:

Service ID; Frequency, which tells how many conditions of the service's conditional statement are true in the fields of this record; and Accuracy, which tells how many different fields of the call record are used in the service's conditional statement (number of AND conditions+1 in the conditional statement).

The following shows the stages of the method according to FIG. 4. Stages 401-404 are performed to set the service in the valid-set table and to set the accuracy according to the accuracy principle.

401) The first line is read from the parameter-set file.
402) The field Service ID 'A1' and the Field 'ASUB' are read from the line.
403) The service ID is searched from the Valid-set table—the ID is not found, therefore it is added to the table in its own Service ID column.
404) The value in the Accuracy column is increased by one.

Stages 405-410 are performed to set suitable service-data accuracy data in the conditional statement of the parameter-set file.

405) The next line is read from the parameter-set file.
406) The field Service ID 'A1' and the Field 'ASUB' are read from the line—as both the Service ID and the Field are the same, move to the next line.
407) The next line is read from the parameter-set file.
408) The field Service ID 'A1' and the Field 'BSUB' are read from the line.
409) The service ID is searched from the Valid-set table—the ID is found, therefore the value in the 'Accuracy' column is increased by one.
410) The next line is read from the parameter-set file and a new start is made from stage 402.

Figure 5:
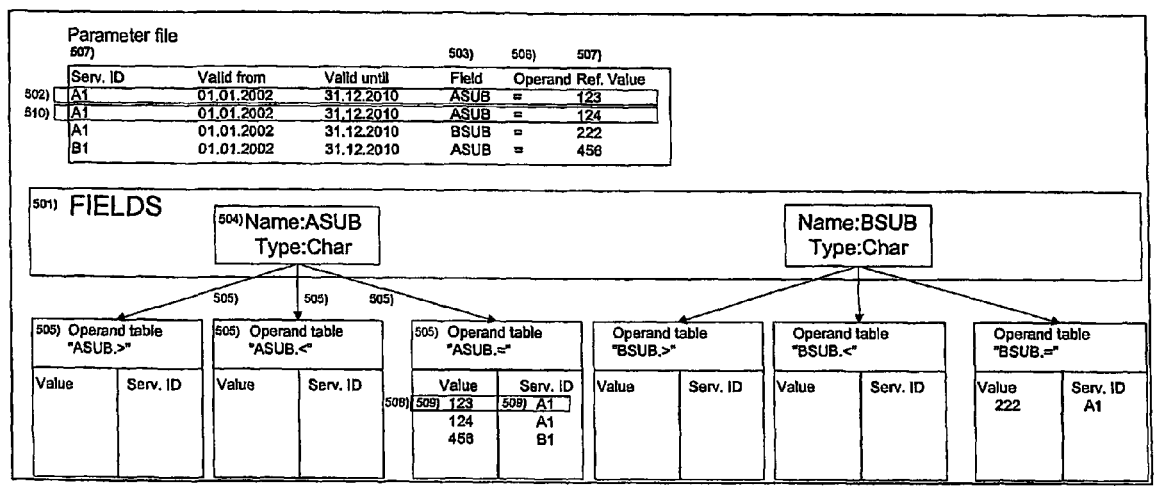
FIG. 5 shows one data structure according to the invention for creating a 'Fields' table, on the basis of the data of a parameter-set file.

Creation of a Fields Table According to FIG. 5, on the Basis of the Data of the Parameter-set File:

The names of the fields are set as the entries of the table and for each field three operand-specific tables are created, which are greater than, less than, and equal to tables. Thus, each field has its own tree-like structure created.

The conditions of the service are recorded in the main memory database as follows. The reference value and the service ID are recorded in the field's operand-specific table. If the reference value already exists, add the service ID to the table, separate by a comma. If the service ID is already in the line, the addition is not made.

Algorithm

The services are numbered in such a way that the service ID is a line number in the valid-set table. By using this method, we can point directly the line of the desired service in the valid-set table.

The value of the field and the operand tables of the field are entered in the algorithm. In the identification of the service, the IDs corresponding to the value of the field are searched from the operand tables. The IDs obtained are combined in such a way that the multiples of the IDs are removed and the result is a field-specific table corresponding to the conditions of the field.

The field-specific tables are reviewed and the frequency of the service ID line of the valid-set table is increased by one. We select as valid the service with the greatest accuracy and the frequency of which is the same as the accuracy, i.e. the conditional statement of the service is true.

In the method according to FIG. 5, the following stages are performed. Stages 501-508 are performed to build a field-specific tree-like classification structure for the specified field.

501) The table FIELDS is created.
502) The first line is read from the parameter-set file.
503) The field 'ASUB' is read from the line and is identified as character type.
504) A entry ASUB is created in the FIELDS table and is set as Character type.
505) An empty operand table 'ASUB.=' is created, and attached to the entry ASUB of the FIELDS table.
506) The operand '=' is read from the line.
507) The reference value '123' and the Service ID 'A1' are read from the line.
508) The value 123 is searched from the reference value column of the operand table 'ASUB.='—the value is not found, so a new line is added to the operand table 'ASUB.='.

Stages 509-510 are performed to complete the contents of the field-specific tree-like classification structure.

509) The value '123' is placed in the reference value column and 'A1' in the Service ID column.
510) The next line is read from the parameter-set file and the procedure is continued from stage 503.

Figure 6:
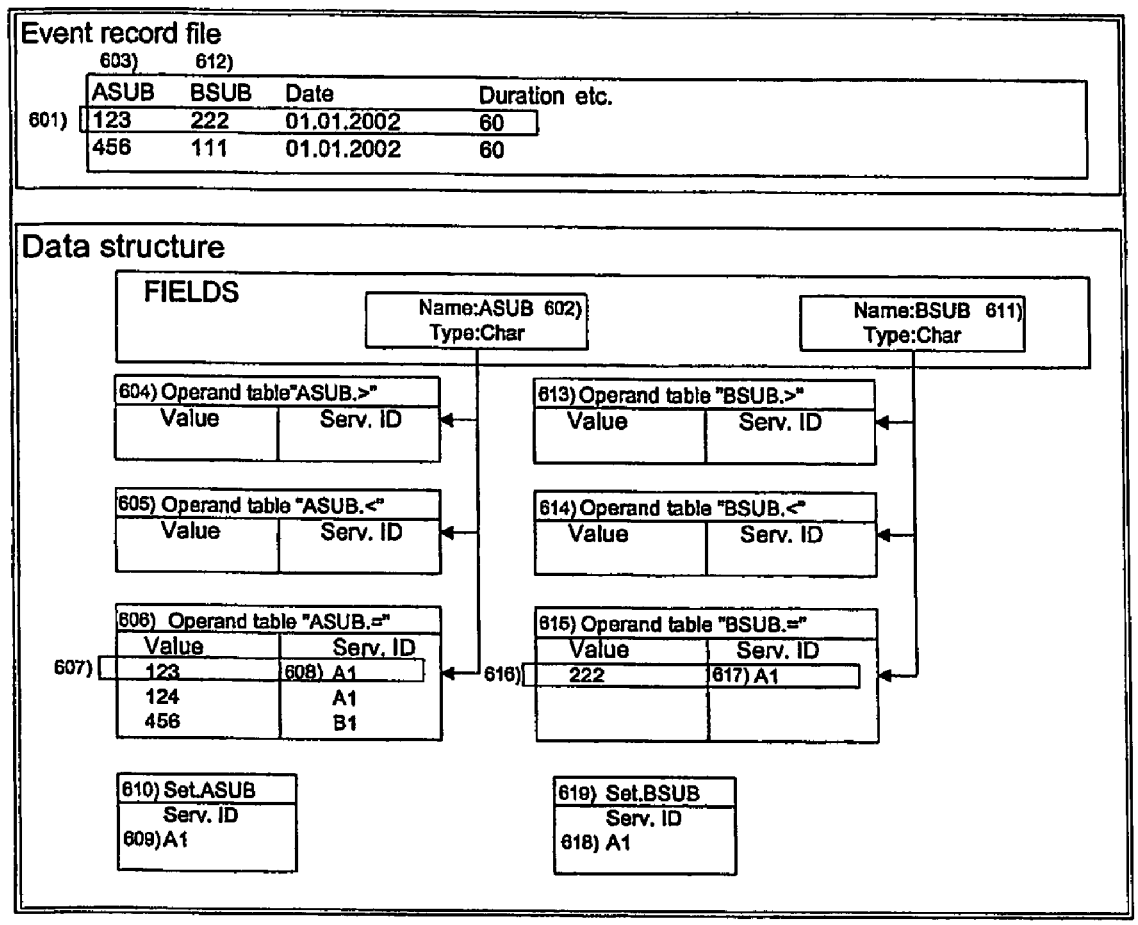
FIG. 6 shows one service identification according to the invention and the creation of field-specific service tables.

Service Identification and Formation of Field-specific Service Tables, According to FIG. 6

The following describes how field-specific service sets are formed on the basis of the values of the record's fields.

The following stages are performed in the method according to FIG. 6:

Stages 601-610 are performed to identify the first value.
601) The first record is read.
602) The first entry name ASUB is searched from the FIELDS table.
603) The content '123' of the field ASUB is read from the record.
604) All lines with a value less than the value '123' in the reference value column are searched from the Operand table 'ASUB.>'.—No such line is found.
605) All lines with a value greater than the value '123' in the reference value column are searched from the Operand table 'ASUB.<'. No such line is found.
606) All lines with the value '123' in the reference value column are searched from the Operand table 'ASUB.='.
607) One such line is found.
608) The Service ID A1 is read from the line 'ASUB.=' of the Operand table.
609) The Service ID A1 is added to the table Set.ASUB.

610) If there are any multiples of the service IDs in the table Set.ASUB, these are removed.

Stages 611-619 are performed in order to identify a second value.

611) The next entry name BSUB is retrieved from the FIELDS table.
612) The content '222' of the field BSUB is read from the record.
613) A1 lines with a value less than the value '222' in the reference value column are searched from the Operand table 'BSUB.>'.—No such line is found.
614) All lines with a value greater than the value '222' in the reference value column are searched from the Operand table 'BSUB.<'.—No such line is found.
615) All lines with the value '222' in the reference value column are searched from the Operand table 'BSUB.='.
616) One such line is found.
617) The Service ID A1 is read from the line 'BSUB.=' of the Operand table.
618) The Service ID A1 is added to the table Set.BSUB.
619) If there are any multiples of the service IDs in the table Set.BSUB, these are removed.

Stage 620 is performed to form field-specific service sets.

620) The value of the next field is read from the record, continuing until the values of all the fields to be processed have been processed.

Figure 7:
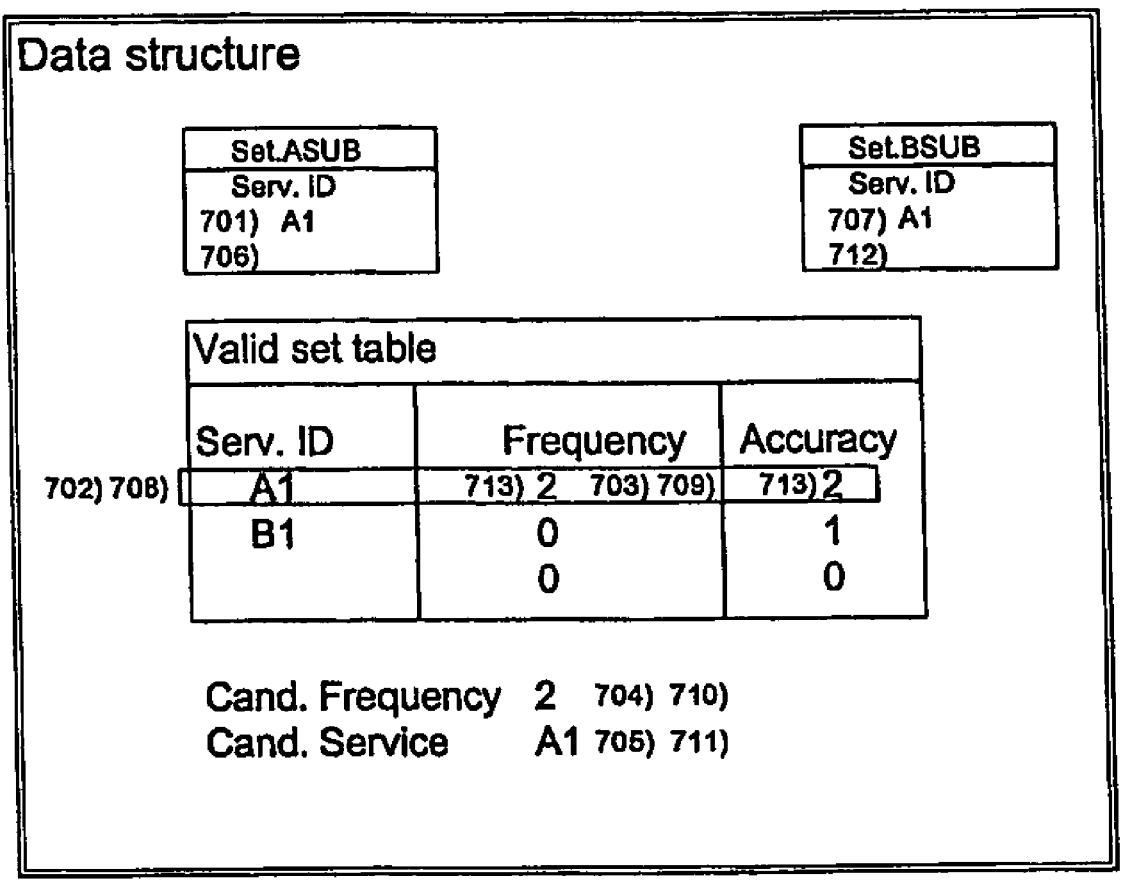
FIG. 7 shows one service identification according to the invention, in which the service ID used is identified from a valid-set table.
Figure 8:
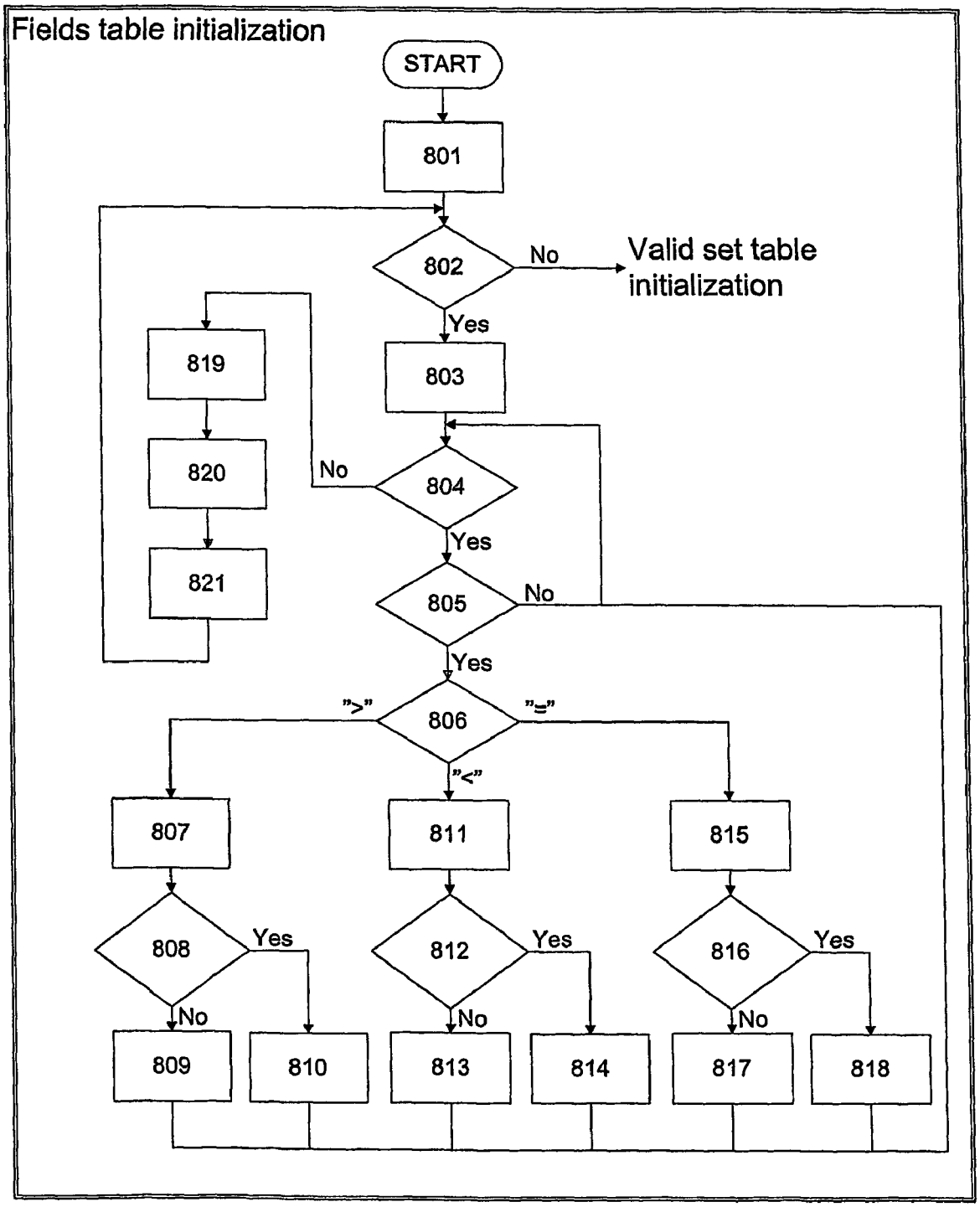
FIG. 8 shows a flow diagram of the initialization of one Fields table according to the invention.

Service Identification According to FIG. 7, in which the ID of the Service Used is Identified from a Valid-set Table.

The following stages are performed in the method according to FIG. 7:

Stages 701-706 are performed to identify the service used from the first set ASUB and to update the frequency of the valid set.

701) The first service ID 'A1' of Set.ASUB Service is read.
702) The line corresponding to the Service ID is searched from the Valid-set table.
703) The Frequency of the Valid-set table is increased by one.
704) The Greatest Frequency is set to the value 1.
705) The Valid Service is set to the value 'A1'
706) The next service ID of the Set.ASUB Service is read—not found.

Stages 707-710 are performed to identify the service used from the second set BSUB and to update the frequency of the valid set.

707) The first service ID of Set.BSUB Service is read.
708) The line corresponding to the Service ID is retrieved from the Valid-set table.
709) The Frequency of the Valid-set table is increased by one.
710) The Greatest Frequency is set to the value 2.

Stages 711-713 are performed to identify the validity of the service.

711) The Valid Service is set to the value 'A1'.
712) The next service ED of Set.BSUB Service is read—not found.
713) A check is made as to whether the Accuracy and Frequency of Valid Service A1 are equal to each other—they are, therefore the valid service is A1.

The following shows the pseudocode of one recommended method according to the invention:

```
/* CREATION OF MAIN MEMORY DATABASE: READ RECORD FROM FILE      */
/* FIELD DESCRIPTION AND CREATE DIFFERENT OPERANDS FOR EACH FIELD  */
/* CORRESPONDING TABLES, WITH CONDITION REFERENCE VALUE AND SERVICE  */
/* ID, TO WHICH CONDITION BELONGS                               */
/* IN CONDITION ASUB > 120 EXPRESSION FACTORS ARE AS FOLLOWS    */
/* ASUB    - FIELD                                              */
/* >       - OPERAND                                            */
/* 120     - REFERENCE VALUE                                    */
CREATE TABLE FIELDS
WHILE (READ NEXT FIELD B)    {
/* COLUMN TYPE IS NUMERIC OR CHARACTER FIELD       */
RECORD FIELD B NAME AND TYPE IN TABLE FIELDS
/* READ CONDITIONS OF THE SERVICES AND RECORD THEM IN GROUPS   */
WHILE (READ CONDITION OF NEXT SERVICE X) {
IF (FIELD B USED IN CONDITIONS) {
/* CREATE GROUPS */
CASE (OPERAND OF CONDITION) {
">": {
CREATE TABLE "B.>"
SEARCH VALUE CORRESPONDING TO REFERENCE VALUE FROM TABLE "B.>"
IF (NOT FOUND) {
ADD REFERENCE VALUE AND SERVICE ID TO OWN COLUMNS "B.>" - TABLE
} ELSE {
ADD SERVICE ID TO "B.>" - TABLE TO LINE CORRESPONDING TO REFERENCE
VALUE TO BE LAST IN SERVICE ID COLUMN
}
}
"<": {
CREATE TABLE "B.<"
SEARCH VALUE CORRESPONDING TO REFERENCE VALUE FROM TABLE "B.<"
IF (NOT FOUND) {
ADD REFERENCE VALUE AND SERVICE ID TO OWN COLUMNS "B.<" - TABLE
} ELSE {
ADD SERVICE ID TO "B.<" - TABLE TO LINE CORRESPONDING TO REFERENCE
VALUE TO BE LAST IN SERVICE ID COLUMN
}
}
"=": {
CREATE TABLE "B.="
SEARCH VALUE CORRESPONDING TO REFERENCE VALUE FROM TABLE "B.="
```

-continued

```
IF (NOT FOUND) {
ADD REFERENCE VALUE AND SERVICE ID TO OWN COLUMNS "B.=" - TABLE
} ELSE {
ADD SERVICE ID TO "B.=" TABLE TO LINE CORRESPONDING TO REFERENCE VALUE
TO BE LAST IN SERVICE ID COLUMN
}
}
}
}
ARRANGE TABLE "B.>" ON BASIS OF REFERENCE VALUE
ARRANGE TABLE "B.<" ON BASIS OF REFERENCE VALUE
ARRANGE TABLE "B.=" ON BASIS OF REFERENCE VALUE
}
/* CREATION OF MAIN MEMORY DATABASE CONTINUES          */
/* CREATE TABLE VALID SET, IN WHICH THERE ARE COLUMNS, SERVICE ID   */
/* FREQUENCY AND ACCURACY. ACCURACIES OF ALL SERVICES INITIALIZED IN
TABLE           */
/* I.E. HOW MANY DIFFERENT FIELDS ARE USED IN THE CONDITIONAL STATEMENT
      */
/* SERVICES READ FROM FILE THE FORM OF WHICH IS */
/* DESCRIBED IN SECTION 5.1.3 DATA STRUCTURE              */
INDEX=0
WHILE ( READ NEXT SERVICE ID X) {
READ HOW MANY DIFFERENT FIELDS ARE USED IN THE CONDITIONAL STATEMENT OF
SERVICE X
/* RECORD ACCURACY */
PLACE NUMBER IN TABLE VALID SET ON INDEX LINE IN ACCURACY COLUMN
INDEX = INDEX + 1
}
/* IDENTIFICATION OF SERVICES OF CALL RECORD       */
/* FUNCTION SEARCH_SERVICE( )                  */
WHILE (READ NEXT FIELD B AND ITS TYPE FROM FIELDS TABLE) {
READ VALUE OF FIELD B
/* TABLE TO WHICH THE VALUE OF FIELD B CORRESPONDS SERVICE IDS
RECORDED*/
CREATE FIELD-SPECIFIC TABLE SET."B"
/* SEARCH SET FROM TABLE I.E. GROUP "B" E.G. USING BINARY SEARCH */
SEARCH FROM TABLE "B.>" NEXT LARGER LINE C TO FIELD'S B VALUE
IF (FOUND) {
COPY ALL SERVICE IDS FROM TABLE "B,>" FROM LINE C ONWARDS TO TABLE
SERVICE SET
SET."B" = SERVICE SET
}
/* SEARCH SET FROM TABLE I.E. GROUP "B.<" E.G. USING BINARY SEARCH
             */
SEARCH FROM TABLE "B.<" NEXT SMALLER LINE C TO FIELD'S B VALUE
IF (FOUND) {
COPY ALL SERVICE IDS FROM START OF TABLE "B.<" TO LINE C TO TABLE
SERVICE SET
SET."B" = SET."B" OR SERVICE SET
}
/* SEARCH SET FROM TABLE I.E. GROUP "B.=" E.G. USING BINARY SEARCH
             */
SEARCH FROM TABLE "B.=" LINE C CORRESPONDING TO FIELD'S B VALUE
IF (FOUND) {
COPY ALL SERVICE IDS FROM LINE C OF TABLE "B.=" TO TABLE SERVICE SET
SET."B" = SET."B" OR SERVICE SET
}
REMOVE FROM TABLE SET."B" LINES THAT HAVE THE SAME SERVICE ID
/* REMINDER FOR IMPLEMENTATION */
/* IN IMPLEMENTATION WHILE (READ TABLE SET. "B" CATEGOR... CAN BE
INSERTED AT THIS POINT */
}
/* FIELD-SPECIFIC SET."B" SERVICE ID SETS ARE NOW FORMED       */
/* PERFORM AND (SET OPERATION INTERSECT) BETWEEN FIELD-SPECIFIC TABLES
         */
/* FROM WHICH THE RESULT OBTAINED IS THE SERVICE ID THAT IS IN ALL
     */
/* FIELD-SPECIFIC SETS, IF SUCH IS NOT FOUND SELECT THE ID THAT IS
     */
/* IN MOST FIELD-SPECIFIC SETS
     */
/* THE AND OPERATION IS IMPLEMENTED IN SUCH A WAY THAT WE COLLECT
     */
/* IN THE VALID-SET TABLE THE NUMBERS OF OCCURRENCES I.E. FREQUENCIES
     */
/* OF THE VARIOUS IDS FROM THE FIELD-SPECIFIC SERVICE ID SETS.
     */
/* WE SELECT AS VALID THE SERVICE THE FREQUENCY OF WHICH IS GREATEST
```

```
                         -continued
AND THE SAME            */
/* AS THE ACCURACY OF THE SERVICE                        */
/* THE TABLE'S VALID SET COLUMNS ARE SERVICE ID, FREQUENCY, AND
                         /*
/* ACCURACY. ACCURACY IS THE NUMBER OF DIFFERENT FIELDS APPEARING IN
THE CONDITIONAL STATEMENT                                */
EMPTY THE TABLE'S VALID-SET COLUMN FREQUENCY
GREATEST FREQUENCY = 0
VALID SERVICE = NULL
WHILE ( READ NEXT FIELD'S B TABLE SET."B") {
WHILE ( READ TABLE'S SET."B" SERVICE ID C ){
INCREASE THE FREQUENCY D OF THE VALID-SET TABLE LINE C SERVICE ID BY
ONE
IF ( SERVICE ID C FREQUENCY D > GREATEST FREQUENCY ) {
GREATEST FREQUENCY = FREQUENCY D OF SERVICE ID C
VALID SERVICE = SERVICE ID C
}
}
}
}
/* THE FIELD-SPECIFIC TABLES SET."B" ARE ARRANGED ALPHANUMERICALLY ON
                         */
/* THE BASIS OF THE SERVICE ID C, IF THERE ARE SEVERAL VALID SERVICES
                         */
/* THEN THE FIRST VALID SERVICE ID IS SELECTED ALPHANUMERICALLY */
/* CHECK WHETHER THE FREQUENCY OF THE SERVICE OBTAINED IS EQUAL TO */
/* THE ACCURACY OF THE SERVICE'S CONDITIONAL STATEMENT, IF IT IS       */
/* NOT, SEARCH FROM THE VALID-SET TABLE THE SERVICE THAT HAS THE */
/* LARGEST FREQUENCY AND THE FREQUENCY IS THE SAME AS THE ACCURACY */
/* OF THE SERVICE        */
IF ( THE FREQUENCY OF THE VALID SERVICE OF THE LINE OF THE VALID-SET
TABLE < THE ACCURACY OF THE LINE'S VALID SERVICE ) {
VALID SERVICE = NULL
/* THE SERVICES ARE IN THE TABLE IN ORDER OF ACCURACY AND ALSO */
/* IN ALPHANUMERICAL ORDER FOR THE SAME ACCURACY ->              */
/* SEARCH THE NEXT SERVICE FOR WHICH THE ACCURACY AND THE FREQUENCY
                         */
/* ARE THE SAME          */
WHILE (RETRIEVE NEXT LINE X OF THE VALID-SET TABLE) {
IF ( FREQUENCY OF VALID-SET TABLE LINE X == ACCURACY OF LINE X ) {
VALID SERVICE = SERVICE ID OF LINE X OF VALID-SET TABLE
BREAK
}
}
}
/* RETURN SERVICE CORRESPONDING TO VALUES OF CALL RECORD FIELDS */
RETURN VALID SERVICE
```

Flow Chart 8 Initialization of 'Fields' Table of Data Structure
Flow chart definitions:
Y=Name of field (e.g., ASUB, BSUB)
X=Service ID (e.g., A1, B1)

Figure 9:
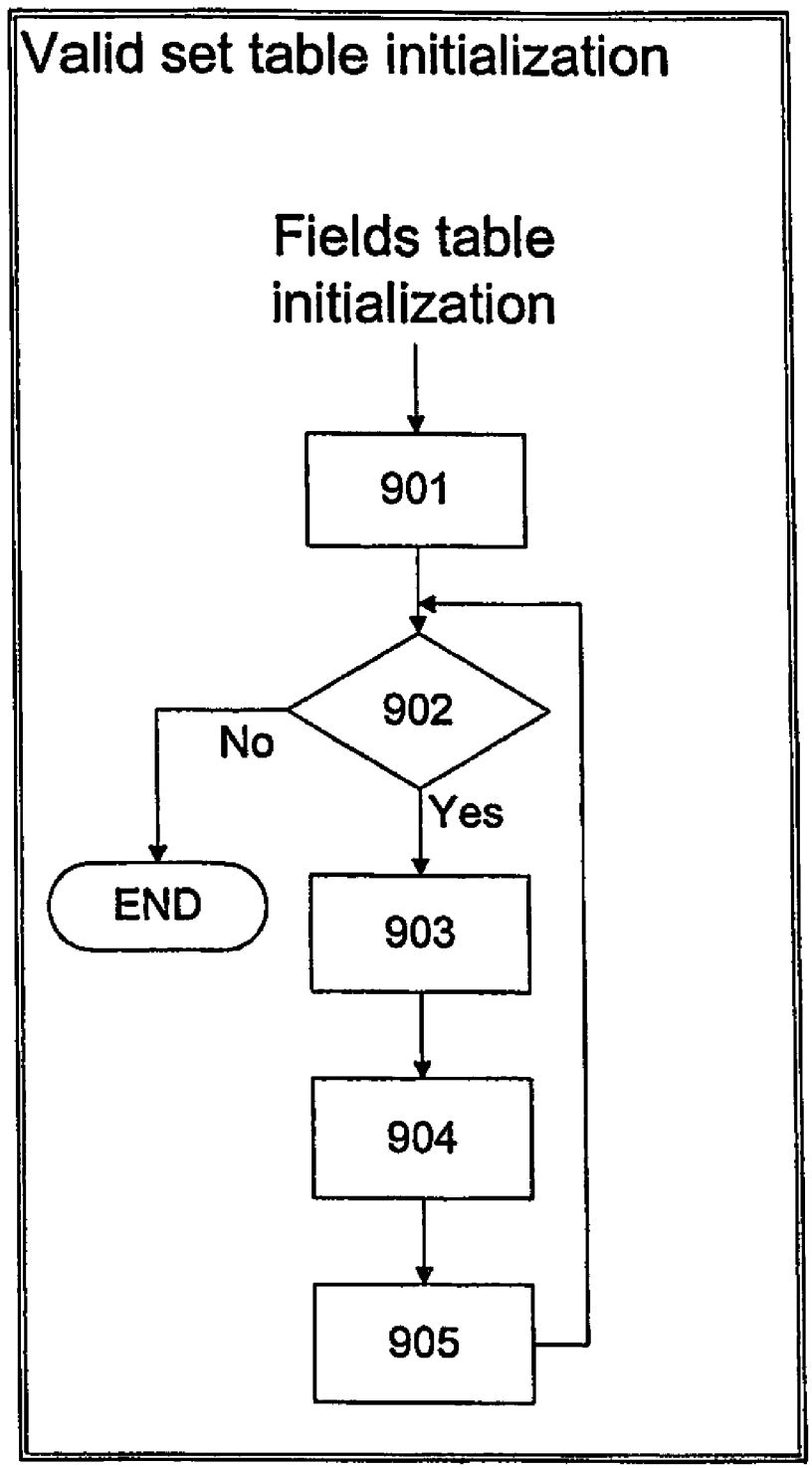
FIG. 9 shows a flow diagram of the initialization of one valid-set table according to the invention.

The following stages are performed in the method. Stages 801-806 are performed to initialize the service:

801) The table 'Fields' is created.
802) The next field is read. If the field is valid move to stage 803. If the field is invalid, move to FIG. 9 initialization of a valid-sets table.
803) The name and type of the fields are recorded in the table 'Fields'.
804) The condition of the next service X is read.
805) Check whether the field Y is used in the condition, if it is move to stage 806, if not move to stage 804.
806) Condition operand menu, from which move to stage 807, 811, or 815, depending on whether the operand is >, <, or =.

Stages 807-810 are performed to process the greater-than condition.

807) The table "Y.>" is created.
808) A value corresponding to the reference value is searched from table "Y.>", for example, using a binary search "Y.>". The comment, 'for example, using a binary search' is also in the pseudocode. In order to be able to use binary search, an appropriate data structure according to the invention must also be formed for it. The search could also be, for example, a hash search, but in that case the data structure would be different. It is true that in that case too the search would be extremely powerful. In other words, this same basic insight of the invention could also be implemented using a different kind of data structure and search algorithm.

809) The reference value and the service ID "Y.>" are added to the table.
810) The service ID is added to be the last in the line corresponding to the reference value in the table "Y.>".

Stages 811-814 are performed to process the less-than condition.

811) The table "Y.<" is created.
812) A value corresponding to the reference value is searched from the table, for example, using a binary search "Y.<".
813) The reference value and the service ID are added to the "Y.<" table.
814) The service ID is added to be the last in the line corresponding to the reference value in the table "Y.<".

Stages 815-818 carry out the processing of the equal-to condition.

815) The table "T.=" is created.

816) A value corresponding to the reference value is searched from the table, for example, using a binary search "Y.=".
817) The reference value and the service ID are added to the "Y.=" table.
818) The service ID is added to be the last in the line corresponding to the reference value in the table "Y.=".
Stages 819-821 are performed to process the table.
819) The table "Y.>" is sorted on the basis of the reference value.
820) The table "Y.<" is sorted on the basis of the reference value.
821) The table "Y.=" is sorted on the basis of the reference value.

Flow Chart 9, Initialization of the Valid-set Table of the Data Structure

In the method, the following stages are performed. Stages 901-905 are performed to define the accuracy of the condition.
901) Move to the start of the parameter-set file.
902) The next service ID X is read. If the next service is found, move to stage 903, if the next service is not found, terminate.
903) Calculate how many different fields are used in the conditional statement of service X.
904) The number is placed in the Valid-sets table, in the column 'Accuracy' of the INDEX line.
905) The value of INDEX is increased by one.

Figure 10:
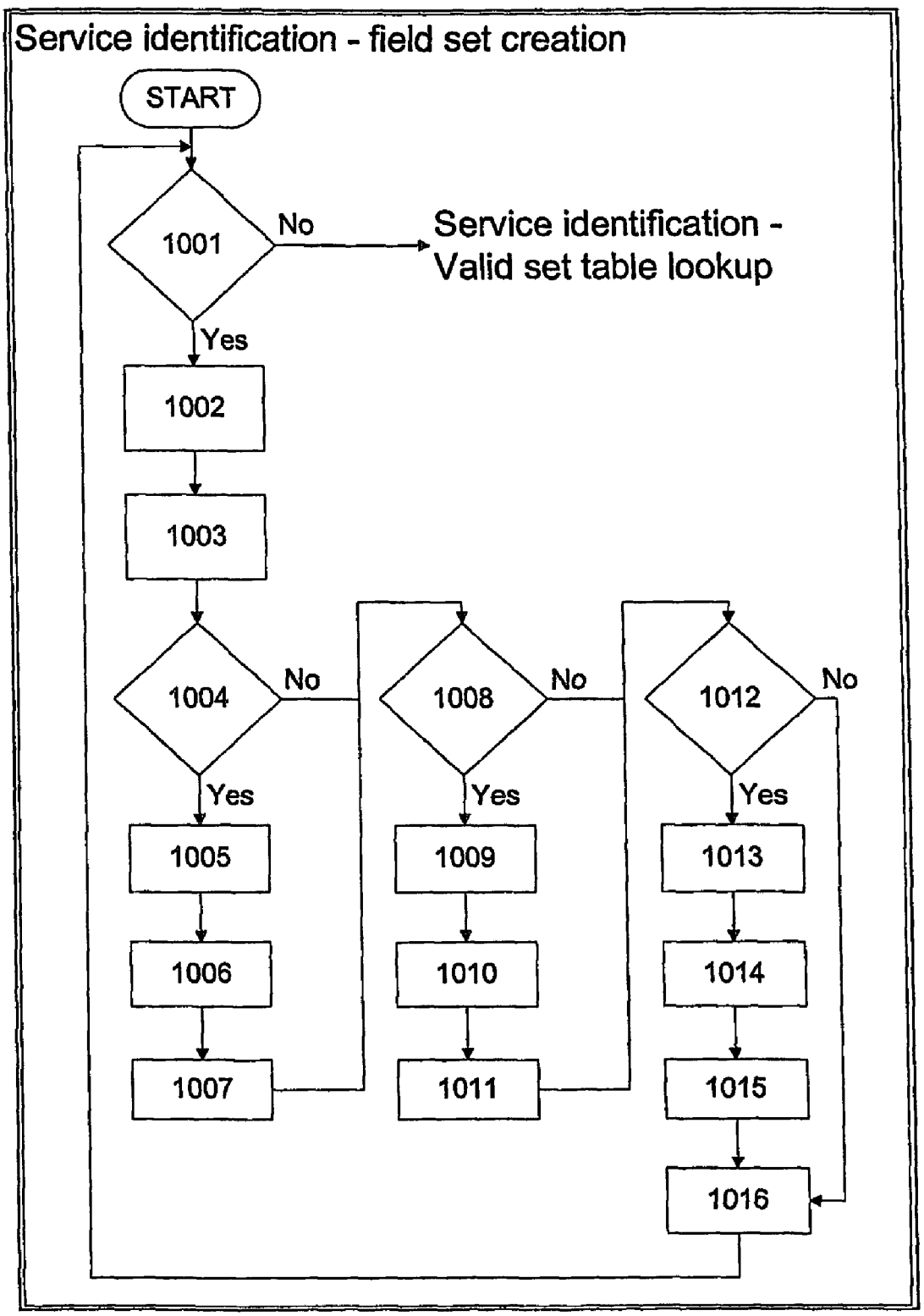
FIG. 10 shows a flow diagram of one service identification according to the invention.
Figure 11:
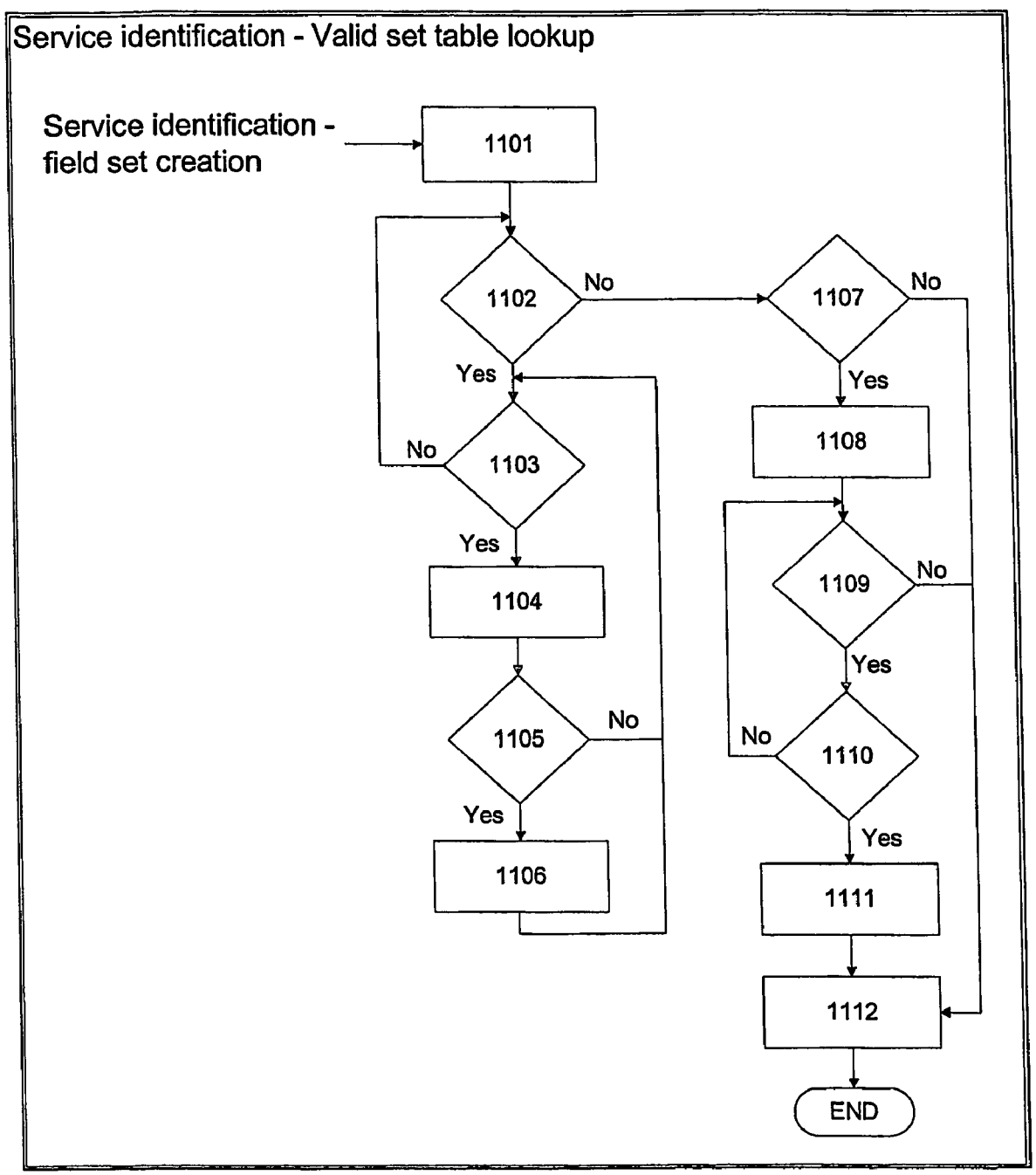
FIG. 11 shows a flow diagram of another service identification according to the invention.

Service Identification According to FIGS. 10-11

The following symbols are used in flow chart 10:
Y=Field name (e.g., ASUB, BSUB)
X=Service ID (e.g., A1, B1).

In the method, the following stages are performed. Stages 1001-1003 are performed to find, from the table, the position according to the value of field Y of a received record.
1001) At least one record is received, the fields of which contain values. The next field Y and its type are read from the Fields table, which is a classification structure and the field-specifically ordered classification structure corresponding to field Y is selected. If the next field is found, move to stage 1002. If the next field is not found, move to FIG. 11.
1002) Read the value of field Y from the record.
1003) Create the field-specific table set "Y".
Stages 1004-1008 are performed to search for the service IDs according to the next greatest reference value to the value of the received record.
1004) The next larger line to the value of the field Y is searched from the table, for example, using a binary search "Y.>". If the line is found, move to stage 1005. If the line is not found, move to stage 1008.
1005) An empty service-set table is created.
1006) All the service IDs are copied, from the retrieved line onwards, from table "Y.>" to the service-set table.
1007) All the service IDs, of which zero or several may be found, from the service-set table are recorded in the Set."Y" table.
1008) The next smaller line than the value of field Y is searched from the table, for example, using a binary search "Y.<". If the line is found, move to stage 1009. If the line is not found, move to line 1012.
Stages 1009-1012 are performed to search the service IDs according to the next smaller reference value to the value of the received record.
1009) An empty service-set table is created.
1010) All the service IDs from the start of the table "Y.<" to the retrieved line are copied to the service-set table.
1011) All the service IDs, which may be zero or several, from the service-set table are recorded in the table Set."Y"
1012) The line corresponding to the value of field Y is searched from the table, for example, using a binary search "Y.=". If a line is found, move to stage 1013. If no line is found, move to stage 1016.
Stages 1013-1016 are performed in order to search the service IDs according to the reference value equal to the value of the received record.
1013) An empty service-set table is created.
1014) All service IDs from the searched line are copied from the table "Y.=" to the service-set table.
1015) All the service IDs, which may be zero or several, from the service-set table are recorded in the table Set."Y".
1016) Remove from the table Set."Y" all lines with the same service ID.

In the part of the method according to flow chart 11, the following stages are performed.

Stages 1101-1102 are formed to reset the monitoring of the appearance frequency and to find the field-specific table to be examined.
1101) The Valid-set table column Frequency is emptied, Greatest frequency=0, Valid service=NULL, move to first field.
1102) Read the table Set."T" of the next field Y.
Stages 1103-1106 are performed to update the found service data into the valid-set table.
1103) The service ID of the table Set."Y" is read.
1104) The service frequency of the Valid-set table is increased by one.
1105) Is the service frequency greater than the Greatest frequency?
1106) Greatest frequency=frequency of service ID, Valid service=Service ID.
Stages 1107-1108 are performed to evaluate the adequacy of the accuracy of the line being examined.
1107) Is the Valid service frequency of the line of the Valid-set table less than its accuracy?
1108) Valid service=NULL.
Stages 1109-1110 are performed to search the line on which the valid service is.
1109) The next line of the Valid-set table is searched.
1110) Is the frequency of the Valid-set table the same as the accuracy of the line?
Stages 1111-1112 are performed in order to searched and return the valid service.
1111) Valid service=service ID X of the line of the Valid-set table.
1112) Return Valid service.

Embodiments of the invention, differing from those disclosed above, can also be contemplated. The following are a few such.

Parsing a conditional statement:

Each service ID corresponds to a conditional statement, in which there are conditions. Parsing a conditional statement is one alternative way to determine which service ID is valid. When parsing, it must be remembered that the conditional statements must be arranged, according to the accuracy principle, from the most accurate to the least accurate.

When parsing a conditional statement, the conditional statement is reviewed in such a way that the value obtained from the record is set for the condition, and an investigation is made as to whether it is true. If the basic operation AND is read from the expression, the next condition is then read and its possible truth is examined. In the basic operation OR, there is no need to read the second condition of the operation, if the first condition is true. The order of performing the conditions and operations can be altered by using brackets in the conditional statement.

Attempts to accelerate parsing require the conditional statements to be reviewed until a valid conditional statement is found, i.e. on average 50% of the conditional statements are reviewed for each record. The principle of parsing is similar to that in the present solution, in which linked lists are reviewed. However, as parsing has only one list, it can be assumed that the speed will be greater than in the linked-lists solution of the state of the art.

Parsing an Equation

Parsing appears to be slow, but the conditions can be resolved beforehand, by giving a condition the value 1 if it is true and the value 0 if it is untrue. The values are placed in the conditional statements and the AND operations are converted to multiplications and the OR operations to additions. The conditional statement then becomes an equation, which can be solved as rapidly as numerical values can be compared. Further, other Boolean/set theory calculations, such as NOR, XAND, XOR, for example are possible operands.

The conditions are recorded in a truth-value table in which there are two columns: condition and truth-value. The truth-values of the conditions are solved as soon as the values of the record have been read. Whether the condition in question is true or untrue (1 or 0) is also entered in the same table.

The implementation is made in such a way that when a conditional statement is parsed, a check is made for each condition as to whether it is already in the truth-value table, and if it is, then, at this point in the conditional statement, an indicator is set to the truth-value in the truth-value table. If the condition is not found in the truth-value table, the condition is added to the truth-value table and an indicator to the truth-value in the truth-value table is set in the conditional statement.

Various adaptations of the set model can be made, which apply the same principles as in the solution now implemented. The following describes some possible adaptations of the use of the principle of the set model.

Wider conditional statement:

The accuracy principle of the identification of the service is widened so that AND, OR, and NOT operands, as well as brackets, can be used entirely freely in the conditional statement. The conditional statement is edited in such a way as to obtain a logically equivalent expression, in which there are no brackets and there are only NOT and NAND operands. The new conditional statement is recorded in the Fields structure and the algorithm is altered so that the processing of the Field-specific service tables and the Valid-sets table will take place correctly.

Selection of the most accurate service:

The accuracy principle of the service identification is altered in such a way that the service with the greatest frequency is selected as valid, irrespective of whether the frequency is the same as the accuracy of the service. Thus the service, the conditional statement of which contains the most true conditions, becomes valid. The change is made in the processing of the Greatest frequency parameter and the Valid-set table.

In the methods according to the invention, a more powerful, i.e. faster, solution than a logical statement could also have been implemented with other algorithms and data structures. I.e., for example, using a hash table or some kind of tree. The methods according to the invention apply the insight that a hit or true can be found from a set of logical statements, without examining the truth of all of the logical statements in the group. The program, algorithm, and data structure themselves are only implementations of the aforesaid insight, which could also have been made in other ways.

The method according to the invention is well suited to application in mediator systems, both prepaid and postpaid, as well as in convergent systems.

Concepts: A mediator system is a system separate from a telecommunications network, which is used to monitor the telecommunications network and perform support operations, such as selecting pricing to event or usage records.

The invention claimed is:

1. A method for classifying records using a processor, the method comprising:
   receiving records containing several fields, the fields of which records contain values,
   reading the values contained in at least two specified fields from each of the received records,
   selecting field-specifically ordered classification structures corresponding to the specified fields, which field-specifically ordered classification structures comprise an own ordered classification structure for each of the specified fields in the received record,
   for each record:
   searching from the selected classification structures a set of suitable classes for each of the specified fields, wherein the suitable classes correspond to a value read from one of said fields, and
   forming an intersection set of the sets of suitable classes, and
   selecting a class from the intersection set and assigning the selected class to the record, whereby said assigned class has been read from the field-specifically ordered classification structure,
   wherein selecting a class includes using the accuracy principle to select the class, to which the record is assigned, from the classes corresponding to a reference value or reference values, in which case that is selected, from of those corresponding to the reference value or reference values, which has the definition of which the greatest number of classification structure conditions are met.

2. A method according to claim 1, wherein:
   forming an intersection set comprises forming a set on the basis of the values of the fields, in such a way that a set of classes is formed for each field; and
   further wherein said intersection set comprises a field-specific set that incorporates service IDs, and a condition of a field used in a conditional statement of a given class of which is true, and
   further wherein selecting a class comprises selecting the class that appears in all of the sets, i.e. whose conditional statement is entirely true.

3. A method according to any one of claim 2 or 1, wherein selecting a class comprises selecting the class to which the record is assigned from the classes corresponding to a reference value or reference values, by applying an intersection or intersections and unions performed using logical operands.

4. A method according to claim 1, wherein searching comprises using a search method that is faster than a sequential search, such as a binary search, a tree search, a hash search, and further wherein the least comparisons are used to find a reference value according to the value read from one of said fields.

5. A method according to claim 1, wherein receiving records comprises receiving records that contain information regarding the properties of the telecommunications connections.

6. A method according to claim 1, wherein the fields of the records are fields marked with a field ID.

7. A method according to claim 1, wherein the fields contain values in various formats, such as numeric and symbolic values, and further wherein there are specific classification structures for the various formats, and/or indicators to the classification structures.

8. A method according to claim 1, wherein said selected class comprises a service class of billable telecommunications services, or a call, and/or types of telecommunications connections.

9. A method according to claim 1, wherein said selecting comprises separating the classes in the intersection set on the basis of conditions relating to the properties of telecommunications connections.

10. A method according to claim 1, wherein at least one field identifier corresponds to a field depicting the duration in time of a billable telecommunications connection and/or a field depicting the volume and/or speed of the data transmitted over a billable telecommunications connection.

11. A method according to claim 1, wherein the received record is a telecommunications network event description record, such as a CDR, ER, IPDR, or UDR.

12. A method according to claim 2 or 1, wherein the names of the fields are set to form the entries of the table and for each field at least one operand-specific table according to at least one of the following operands is created, greater than (>), greater than or equal to (>=), less than <, less than or equal to (<=), equal to (=), and not equal to (!=) tables, so that a tree-like field-specific classification structure is created for each specified field.

13. A method according to claim 1, wherein the intersection set includes more than one class and, of these classes, the class with the greatest accuracy is selected during said selecting step, wherein accuracy is defined on the basis of the number of fields used in a conditional statement of the class.

14. A method according to claim 1, wherein the intersection set is an empty set and the class is selected in such a way that a review is made of the statement with next lowest accuracy.

15. A method according to claim 1, wherein said method is performed in a mediator system of a telecommunications network.

16. A computer-readable storage medium having embodied thereon a program that, when executed, causes a computer to execute a method for classifying records, the method comprising:

receiving records containing several fields, the fields of which records contain values, reading the values contained in at least two specified fields from each of the received records, selecting field-specifically ordered classification structures corresponding to the specified fields, which field-specifically ordered classification structures comprise an own ordered classification structure for each of the specified fields in the received record, for each record:

searching from the selected classification structures a set of suitable classes for each of the specified fields, wherein the suitable classes correspond to a value read from one of said fields, and forming an intersection set of the sets of suitable classes, and selecting a class from the intersection set and assigning the selected class to the record, whereby said assigned class has been read from the field-specifically ordered classification structure, wherein selecting a class includes using the accuracy principle to select the class, to which the record is assigned, from the classes corresponding to a reference value or reference values, in which case that is selected, from of those corresponding to the reference value or reference values, which has the definition of which the greatest number of classification structure conditions are met.

* * * * *